United States Patent [19]

Gatley

[11] 4,225,387

[45] Sep. 30, 1980

[54] LIQUID METAL COOLED PAST BREEDER NUCLEAR REACTORS

[75] Inventor: John A. Gatley, Warrington, England

[73] Assignee: Nuclear Power Company Limited, London, England

[21] Appl. No.: 13,816

[22] Filed: Feb. 22, 1979

[30] Foreign Application Priority Data

Mar. 7, 1978 [GB] United Kingdom ................. 9078/78

[51] Int. Cl.² ............................................ G21C 15/00
[52] U.S. Cl. ...................................... 176/18; 176/40; 176/61
[58] Field of Search ...................... 176/40, 50, 61, 78, 176/43, 86 R, 17, 18

[56] References Cited

U.S. PATENT DOCUMENTS

| | | | |
|---|---|---|---|
| 3,208,913 | 9/1965 | Hennig | 176/61 |
| 4,032,398 | 6/1977 | Cross et al. | 176/61 |
| 4,108,721 | 8/1978 | Drzewiecki et al. | 176/86 R |

FOREIGN PATENT DOCUMENTS 1020668 2/1966 United Kingdom ..................... 176/43

*Primary Examiner*—Harvey E. Behrend
*Attorney, Agent, or Firm*—Larson, Taylor and Hinds

[57] ABSTRACT

A liquid metal cooled fast breeder nuclear reactor wherein the fuel assembly includes some breeder fuel sub-assemblies having electromagnetic brakes and fluidic valves of the controlled vortex kind for controlling the coolant outlet temperature. The coolant flow through each breeder sub-assembly is divided into a major flow fraction by way of the fluidic valve and fuel pins a minor flow fraction by way of the electromagnetic brake which is sensitive to the temperature of coolant flow. A control component of force for the fluidic valve is derived from the back pressure of the brake so that as the power output of the sub-assembly increases the braking effect diminishes and flow of coolant through the fluidic valve is increased.

4 Claims, 5 Drawing Figures

LIQUID METAL COOLED FAST BREEDER NUCLEAR REACTORS

BACKGROUND OF INVENTION

This invention relates to liquid metal cooled fast breeder nuclear reactors.

In a liquid metal-cooled fast breeder nuclear reactor, the fuel assembly comprises a multiplicity of slender fuel elements or pins over which liquid metal coolant such as sodium is flowed. For convenience, the fuel assembly is divided into a plurality of interchangeable sub-assemblies, each comprising a plurality of fuel pins enclosed by a wrapper and having a lifting head. The sub-assemblies are positioned in side-by-side array and each one is located in cantilever manner by a lower end spike which is plugged into a fuel assembly supporting diagrid. The sub-assemblies in the central region of the fuel assembly mainly comprise fissile material whilst the sub-assemblies in the surrounding outer region comprise breeder material. During operation of the nuclear reactor the breeder material captures neutrons emitted by fission in the fissile material to produce further fissile material. As irradiation of the fuel assembly progresses and the fissile content of the breeder material increases, fission of some of the newly formed fissile material takes place so that the power output and, therefore, the coolant temperature from the breeder sub-assemblies progressively increases. Increased and varying temperatures of coolant streams flowing from the fuel assembly give rise to a condition known in the fast reactor art as thermal striping, a condition which, because of rapid temperature fluctuations, causes cracking in reactor structure material. In co-pending application Ser. No. 964,350 by Edward Duncombe and Gordon Thatcher there is disclosed a liquid metal cooled fast breeder nuclear reactor wherein each of at least some of the breeder sub-assemblies has an electromagnetic brake for regulating the flow of coolant through the sub-assembly, the magnetic fields of the electromagnetic brakes being temperature sensitive. In an electromagnetic braking device a liquid metal flow duct is directed through a transverse magnetic field so that when liquid metal flows through the duct and magnetic flux a retarding force in opposition to the fluid flow is set up by electromagnetic interaction. The electromagnetic brake serves to restrict flow of coolant through the breeder sub-assemblies the restriction being temperature dependent and reducing with increased temperature so that, with increased power output, coolant flow is increased thereby maintaining the outlet temperature of the coolant substantially constant. The reduced restriction is caused by reduced magnetic flux permeability of the magnetic materials caused by increased temperature. Two disadvantages are envisaged with the construction described in application Ser. No. 964,350 firstly, when the restriction to flow due to the electromagnetic brake is high, coolant pressure in the sub-assembly wrapper is high causing dilation of the wrapper under irradiation creep, and secondly, an electromagnetic brake of sufficient capacity is of relatively large proportions and therefore difficult to accommodate in the fuel sub-assembly structure.

An object of the present invention is to provide a liquid metal-cooled fast breeder nuclear reactor having breeder fuel sub-assemblies with electromagnetic brake means of relatively small proportions and which seeks to maintain the outlet coolant temperature of at least some of the breeder sub-assemblies substantially constant throughout the life of the fuel assembly without severely pressurising the sub-assembly.

SUMMARY OF INVENTION

According to the present invention in a liquid metal cooled fast breeder nuclear reactor having a fuel assembly in which each of at least some breeder sub-assemblies has an electromagnetic brake for regulating the flow of coolant through the sub-assembly, the magnetic fields of the electromagnetic brakes being temperature sensitive, the coolant flow through each sub-assembly having an electromagnetic brake is divided into major and minor fractions, the major fraction flow being by way of a fluidic flow control device and, successively, a bundle of fuel pins whilst the minor flow is by way of the electromagnetic brake, the electromagnetic brake being sensitive to the major flow outlet temperature and a control component of force for the fluidic flow control device being derived from the back pressure of the minor flow. The electromagnetic brake serves to restrict flow of the minor fraction of coolant when power output from the breeder sub-assembly is low the back pressure serving as a control component of force for the fluidic flow control device thereby restricting flow of the major fraction through the sub-assembly.

In a preferred construction the fluidic flow control devices are valves of the controlled vortex kind hereinafter termed vortex amplifiers.

The electromagnetic brakes are arranged progressively to decrease the resistance of the fluidic flow control device to coolant flow and thereby increase the rate of coolant flow through the sub-assemblies as the breeder power output rises during continued irradiation of the reactor fuel assembly so that the outlet coolant temperatures of the breeder sub-assemblies which include brakes are maintained substantially constant.

The electromagnetic brakes may utilise pole pieces of ferromagnetic alloy having a Curie point approximately equal to the desired coolant outlet temperature of the breeder sub-assemblies.

DESCRIPTION OF DRAWINGS

A liquid metal-cooled fast breeder nuclear reactor embodying the invention is described by way of example with reference to the accompanying drawings wherein.

DESCRIPTION OF PREFERRED EMBODIMENTS

Figure 1:
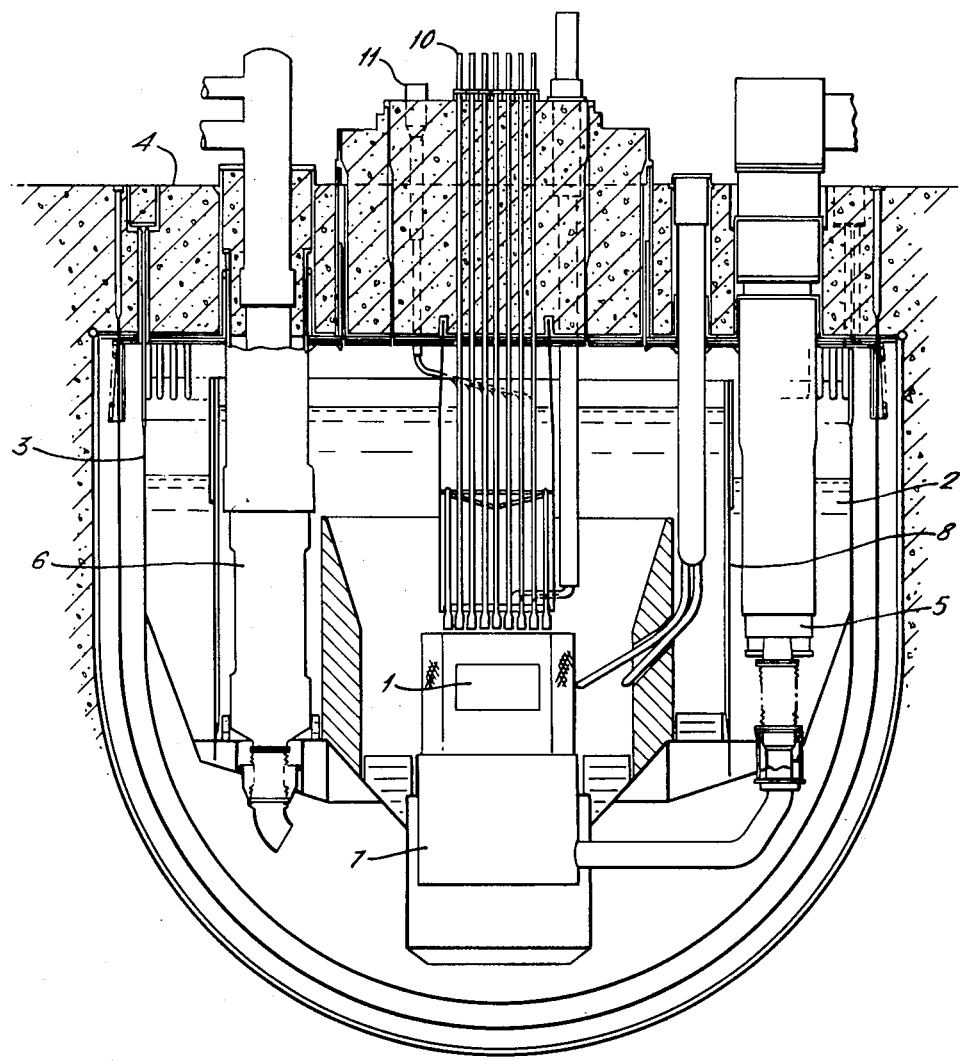
FIG. 1 is a diagrammatic cross-sectional view.

FIG. 1 illustrates a liquid metal-cooled fast breeder nuclear reactor having a fuel assembly 1 submerged in a pool 2 of liquid sodium coolant in a primary vessel 3. The primary vessel is suspended from the roof of a containment vault 4 and there is provided a plurality of coolant pumps 5 and heat exchangers 6 only one of each of pump and heat exchangers being shown. The fuel assembly 1 mounted on a diagrid 7 is housed with the exchangers in a core tank 8 whilst the pumps 5, which deliver coolant to the diagrid, are disposed outside of the core tank. The core or fuel assembly 1 comprises a plurality of interchangeable sub-assemblies 9 which upstand from the diagrid in closely spaced side-by-side array. Control rods 10 and instrumentation 11 penetrate the roof of the vault. The fuel assembly 1 comprises a central region having sub-assemblies 9 containing fissile or driver material and an outer annular region having sub-assemblies containing fertile or breeder material. Each of the breeder sub-assemblies has an annular electromagnetic brake, to be described hereafter, and a fluidic valve of the controlled vortex kind that is, a vortex amplifier, for regulating the flow of coolant through the breeder sub-assemblies. The magnetic fields of the electromagnetic brakes are temperature sensitive so that the coolant flow is increased as breeder power output increases during continued irradiation of the fuel assembly. The rate of coolant flow through the sub-assemblies is thereby progressively increased to maintain the coolant outlet temperature substantially constant.

Figure 2:
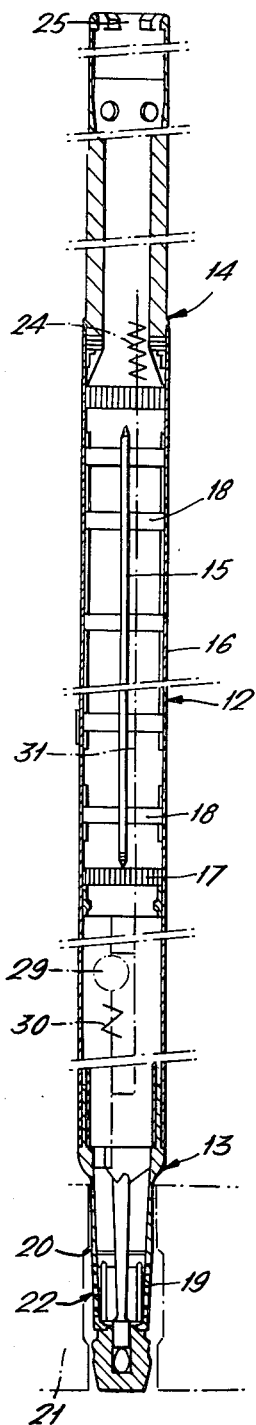
FIG. 2 is a diagrammatic cross-sectional view of a breeder fuel sub-assembly.

The sub-assemblies 9, as shown in FIG. 2, each comprise a central fuel section 12, a lower end locating section 13 and a tubular upper end section 14. The fuel section comprises a bundle of elongate fuel pins 15 enclosed within a tubular wrapper 16 of hexagonal cross-section, the pins being supported within the wrapper at their lower ends by a grid 17 and braced intermediate their lengths by cellular grids 18 of honeycomb form. The lower end locating section 13 comprises a spike 19 for engaging sockets 20 in a fuel assembly support structure 21 and has apertures 22 through which coolant can flow from within the structure. The tubular upper section 14 which defines an outlet for coolant flow has a lifting head 25.

The pins of the fuel sub-assemblies 9 in the central section of the fuel assembly contain fissile materials, for example, mixed oxides of Pu239 and U235 although at each end of the pins there is a quantity of fertile material, for example, oxide of U238. The pins of the fuel sub-assemblies in the outer region surrounding the central region of the fuel assembly contain fertile or breeder material, for example, oxide of U238.

Figure 5:
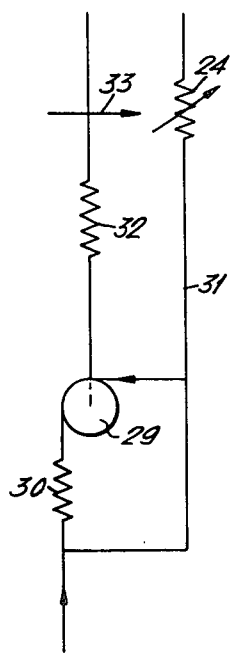
FIG. 5 is a line diagram of coolant flow through the breeder fuel sub-assembly.

Each of the breeder fuel sub-assemblies has (as shown diagrammatically in FIGS. 2 and 5) a fluidic valve 29 of the controlled vortex kind through which a major fraction of the coolant flows upwardly from the lower end spike 19 by way of a gag 30 thence to flow in heat exchange with the fuel pins 15. A minor fraction of coolant flows from a point preceding the gag 30 through an electromagnetic brake 24 disposed in the upper section of the sub-assembly by way of duct 31. The duct 31 occupies a regular lattice position in a bundle of fuel pins arranged on a lattice, that is, it occupies a position normally occupied by one of the fuel pins in a conventional sub-assembly. In FIG. 5 the resistance to coolant flow due to the bundle of fuel pins is designated 32 and there is a temperature coupling 33 between the major flow of coolant and the electromagnetic brake.

Figure 3:
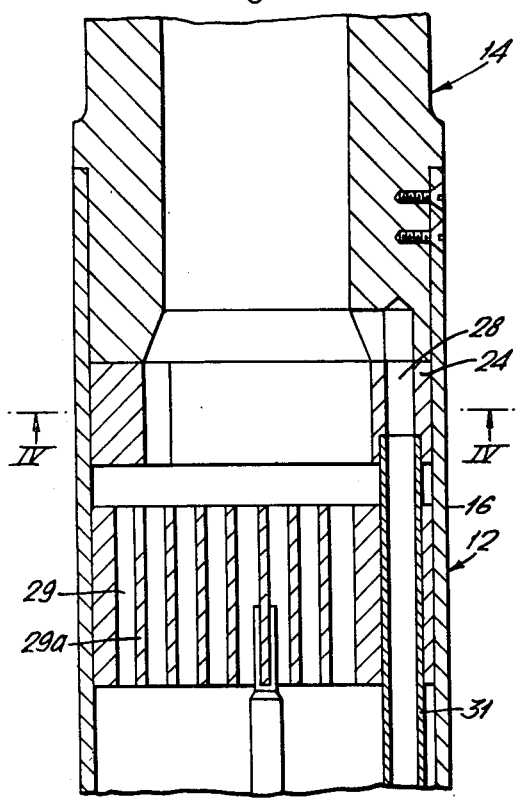
FIG. 3 is a fragmentary view of an upper region of a breeder fuel sub-assembly.
Figure 4:
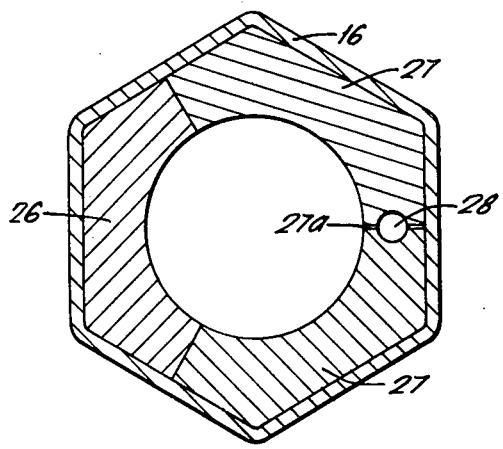
FIG. 4 is a cross-sectional view of an electromagnetic brake on line IV—IV of FIG. 3.

The construction of an envisaged electromagnetic brake 24 is shown in FIGS. 3 and 4 wherein there is shown a fragment of the central fuel section 12 of which the wrapper 16 is extended by the tubular upper end section 14. The fuel section 12 includes an end grid 29 of which bars 29a engage bifurcated ends of fuel pins 15 one only being shown in FIG. 3. The electromagnetic brake 24 as shown in FIG. 4 comprises an arcuate permanent magnet 26 and complementary arcuate pole pieces 27 of ferromagnetic material which close the magnetic circuit. The duct 31, in the form of a tube which occupies a space in the bundle of pins normally occupied by a fuel pin, enters a passage 28 for the minor fraction flow of liquid metal and formed by the ends of the pole pieces 27 and a filler strip 27a. The duct opens into the bore of the tubular upper endsection 14. The pole pieces have Curie point at temperature substantially equal to the desired outlet coolant temperature of the sub-assembly. The braking effort of the electromagnetic device is dependent on the intensity of the magnetic flux conducted across the passage 28 and the rate of flow of the coolant whereby circulatory currents are set up in the liquid metal in a plane normal to the direction of the coolant flow. The circulatory currents induce an opposing force to the flow of coolant.

In operation of the nuclear reactor, liquid metal coolant drawn from the outer region of the pool is passed upwardly through the fuel sub-assemblies in heat exchange with the fuel pins 15 thence from the upper sections. During operation of the reactor neutrons omitted by fissions in the fissile region of the fuel assembly are captured by the fertile material thereby creating within it a fissile content which progressively increases as irradiation progresses. Some of the newly created fissile material in the breeder sub-assemblies will also undergo fission, the rate of fission increasing as the fissile content increases with the result that the power output of the breeder sub-assemblies progressively increases. The electromagnetic brakes 24 serve to restrict flow of the minor fraction of coolant the back pressure serving as a control component for the fluidic valve thereby restricting flow of the major fraction through the breeder sub-assemblies. The restrictions to the minor flow is temperature dependent and reduces with increased temperature of the major fraction flow outlet so that, with increased power output, total coolant flow through the sub-assembly is increased thereby maintaining the outlet temperature of the coolant substantially constant. The reduced restriction through the fluidic valve is caused by reduced back pressure in the duct 31 which in turn is caused by the reduced magnetic flux permeability of the magnetic materials resulting from increased temperature. In use the wrapper of the sub-assembly is not severely pressurised because the restriction to flow of the major fraction of coolant flow occurs in the fluidic valve which is disposed upstream of the fuel pins so that dilation of the wrapper under irradiation creep is largely avoided. Furthermore, because the electro-magnetic brake is required to control only the minor fraction of coolant flow, a relatively small fraction, a brake of sufficient capacity can be of relatively small proportions thereby facilitating its accommodation in the sub-assembly. Use of smaller permanent magnets also has the advantageous effect of reducing the amount of cobalt in the system.

I claim:

1. An improved liquid metal cooled fast breeder nuclear reactor having a fuel assembly in which each of at least some breeder sub-assemblies has an electromagnetic brake for regulating the flow of coolant through the sub-assembly, the magnetic brakes being temperature sensitive, wherein the improvement comprises a fluidic flow control device in each of the breeder sub-assemblies having an electromagnetic brake and means for dividing the coolant flow through said sub-assemblies into major and minor fractions, the major fraction flow being by way of the fluidic flow control device and, successively, a bundle of fuel pins whilst the minor flow is by way of the electromagnetic brake, the electromagnetic brake being sensitive to the major flow outlet temperature and a control component of force for the fluidic flow control device being derived from the back pressure of the minor flow.

2. A nuclear reactor according to claim 1 wherein the fluidic flow control devices are valves of the controlled vortex kind.

3. A nuclear reactor according to claim 2 wherein the minor fraction of coolant flow is by way of a duct which occupies a regular lattice position in a bundle of fuel pins arranged on a lattice.

4. A nuclear reactor according to claim 3 wherein the electromagnetic brake comprises an arcuate permanent magnet and complementary arcuate pole pieces of ferromagnetic material which close the magnetic circuit, the duct passing between abutting ends of arcuate pole pieces.

* * * * *